July 14, 1942.  A. R. DUVALL  2,289,762
METHOD AND APPARATUS FOR FILTERING
Filed May 8, 1939  4 Sheets-Sheet 1
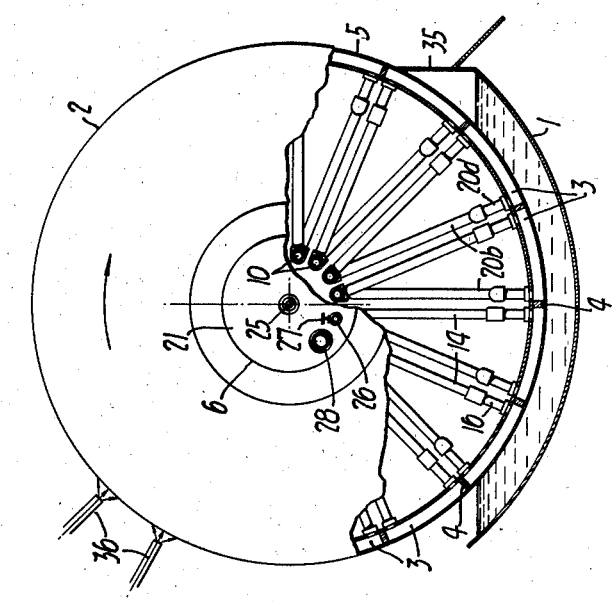
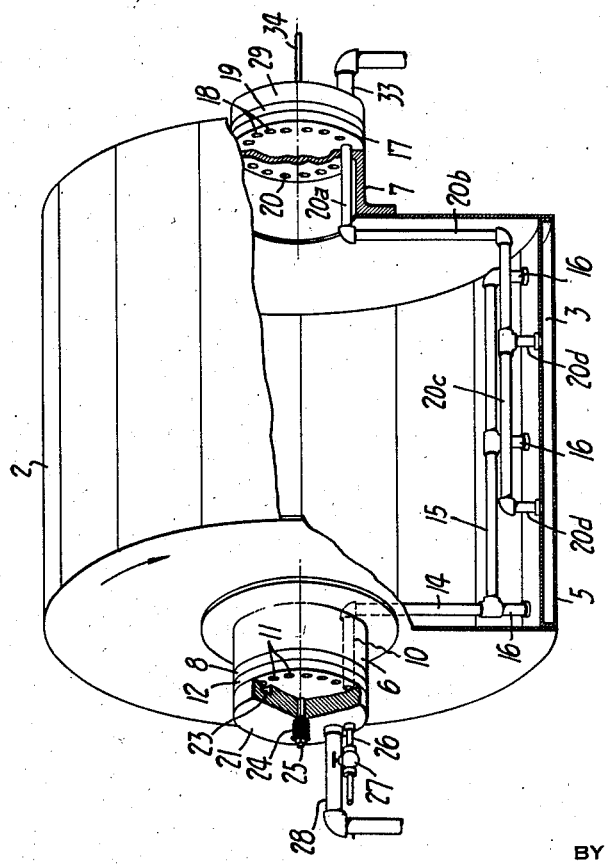
INVENTOR
Allan R. Duvall
BY
ATTORNEY July 14, 1942.  A. R. DUVALL  2,289,762
METHOD AND APPARATUS FOR FILTERING
Filed May 8, 1939 — 4 Sheets-Sheet 2
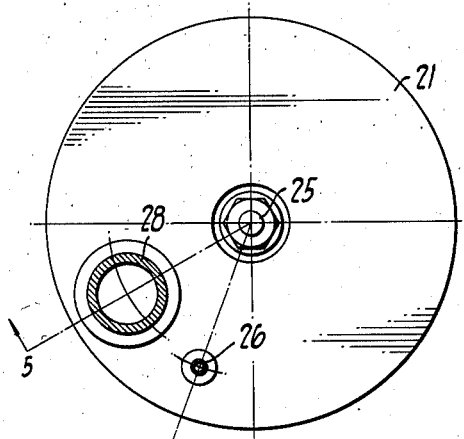
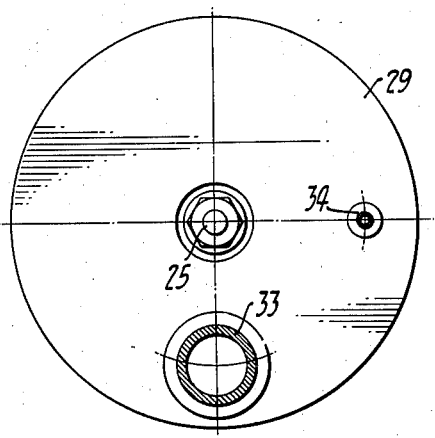
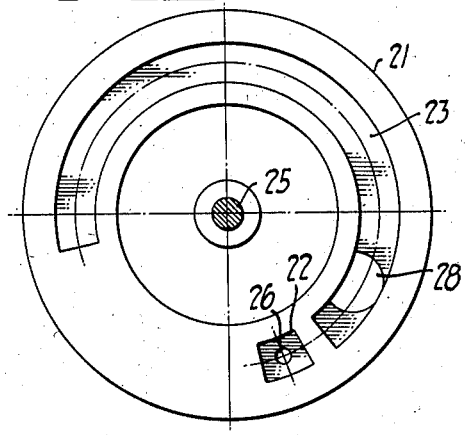
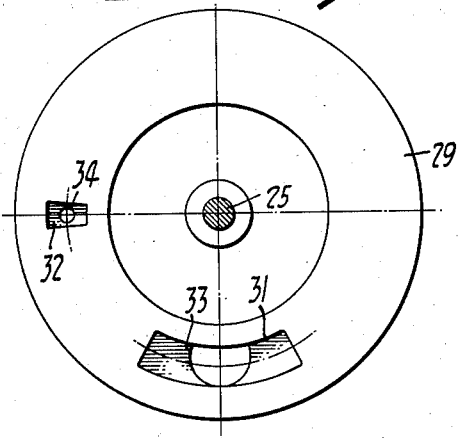
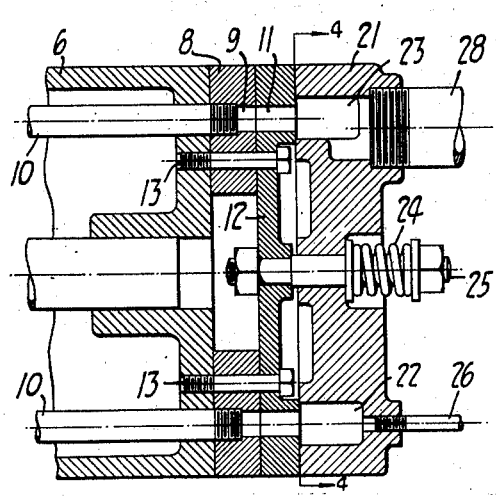
INVENTOR
Allan R. Duvall
BY
ATTORNEY July 14, 1942.　　　A. R. DUVALL　　　2,289,762
METHOD AND APPARATUS FOR FILTERING
Filed May 8, 1939　　　4 Sheets-Sheet 3
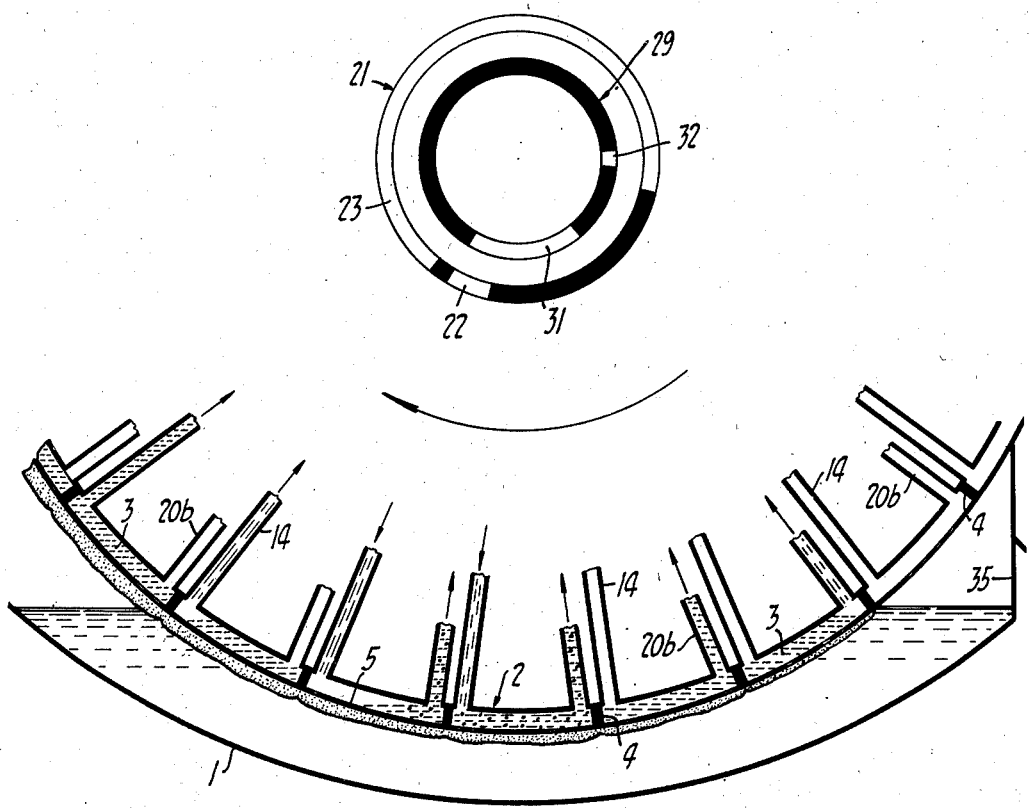
FIG_8_
INVENTOR
Allan R. Duvall
BY
ATTORNEY July 14, 1942.  A. R. DUVALL  2,289,762
METHOD AND APPARATUS FOR FILTERING
Filed May 8, 1939  4 Sheets-Sheet 4
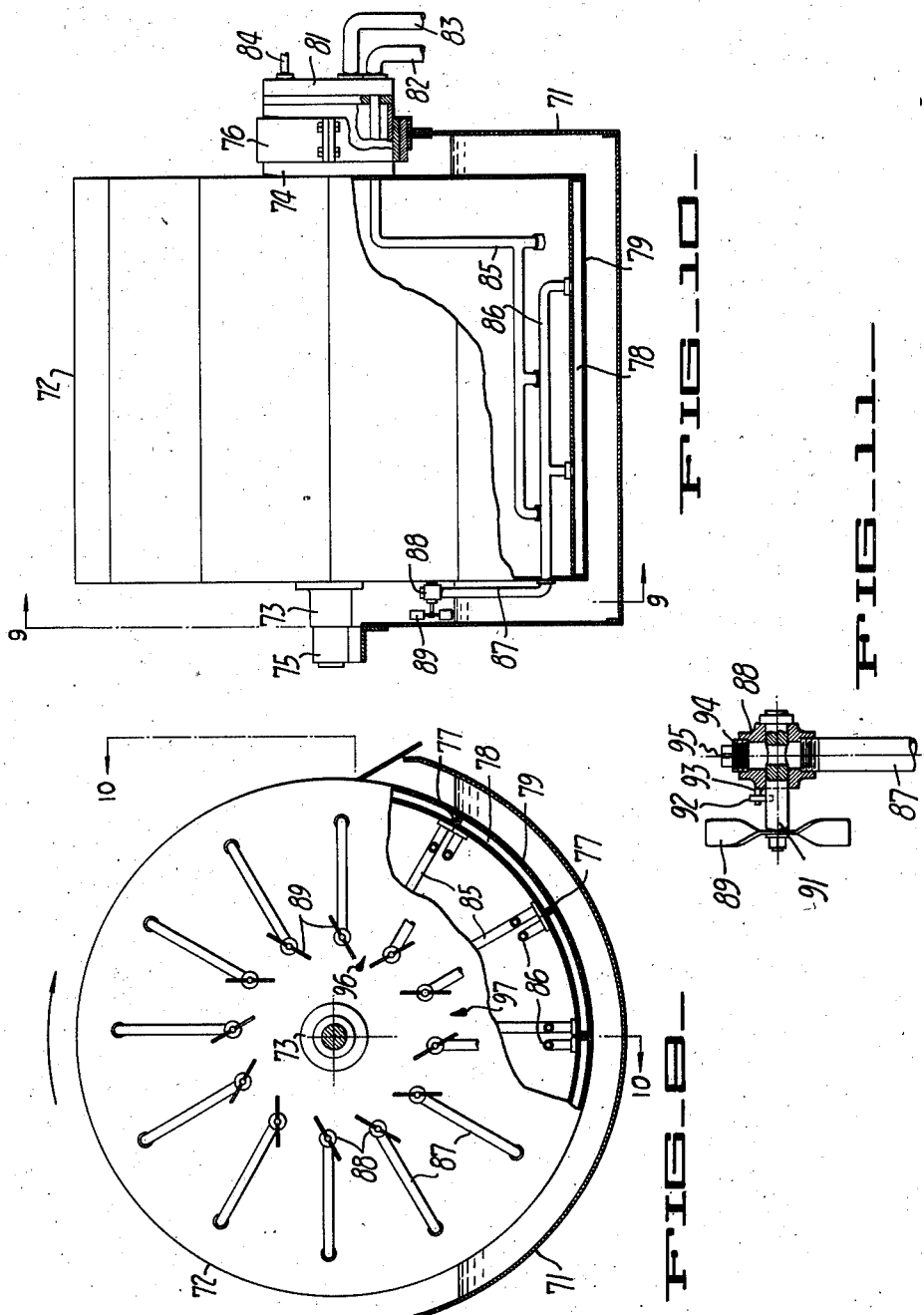
INVENTOR.
Allan R. Duvall
BY
ATTORNEY Patented July 14, 1942

2,289,762

UNITED STATES PATENT OFFICE 2,289,762

METHOD AND APPARATUS FOR FILTERING

Allan R. Duvall, Honolulu, Territory of Hawaii, assignor to Oliver United Filters Incorporated, San Francisco, Calif., a corporation of Nevada Application May 8, 1939, Serial No. 272,453

10 Claims. (Cl. 210—202)

This invention relates in general to industrial filters for the separation of liquids and solids, and more particularly to means for effecting a sharp separation between the initial or primary filtrate and the secondary filtrate.

In industrial filters, filtration actually occurs not on the so-called filter medium of the filter, but rather on the initial layer of solids deposited on the filter medium. Until this initial layer of solids is formed, there is a sufficient quantity of solid particles passing through the filter with the filtrate to make the filtrate cloudy. If the filtrate is of value it is frequently desirable to effect a sharp separation between this cloudy filtrate and the clear filtrate which follows, and it is often desirable to effect a sharp separation between the filtrate per se and the diluted washings.

An appreciation of the obstacles in the way of effecting a sharp separation between the primary and secondary filtrates on industrial filters may best be gained by a brief consideration of the construction and operation of these filters. Essentially, a continuous rotary drum vacuum filter such as manufactured by Oliver United Filters Inc. comprises a pulp or slurry tank within which is made to rotate on suitable trunnions a drum provided on its outer surface with a plurality of independent filtrate compartments. Communication between each of the filtrate compartments and a two-solution automatic valve associated with one of the trunnions is established by piping disposed within the drum. By means of the automatic valve, each of the filtrate compartments may be successively subjected to sub-atmospheric or super-atmospheric pressure as desired. The outer surface of each filtrate compartment is covered with a filter medium specially designed to handle the particular material being filtered.

In operation, each filtrate compartment as it submerges below the level of the material carried in the slurry tank is subjected to sub-atmospheric pressure which causes the liquid content of the material being filtered to pass through the filter medium and the solid content to form a cake thereon. Until a film or layer of cake has been deposited on the filter medium, there is a sufficient quantity of finely divided solids which pass through the filter medium to make the filtrate cloudy. After a layer of solids has been deposited on the filter medium, it itself serves as a filter medium of such character as to retain all solids, and therefore the filtrate which passes through this layer of cake will be found to be clear. If the cloudy filtrate is of value, the economy of the process may require that it be recirculated through the filter after having been introduced at a previous point in the process.

In most filtration operations it is necessary to subject the cake to a displacement wash, for if the filtrate is of value, the filtrate entrained within the interstitial spaces of the cake must be displaced with water or other wash solution and recovered, while if the cake is of value, it is usually necessary to wash it free and clear of entrained filtrate containing undesirable chemicals in solution. This washing operation is accomplished by subjecting the cake, as it emerges from the pulp or slurry tank, to a water wash usually in the form of a spray. Oftentimes it is desired to discharge the cake from the drum in as dry a condition as possible, and therefore after the cake has been washed, air, either at atmospheric temperature or at elevated temperatures, is drawn through the cake just prior to the point at which it is discharged from the drum. It will therefore be seen that the entire filtration operation consists of a so-called "pick-up" period during which the cake is formed on the surface of the drum, a washing period, a drying period, and a discharge period, all of which must be carried out within a limited period of time.

The efficiency of the filter and therefore its capacity, depend upon maintaining the conditions under which filtration is effected such that a cake of uniform consistency is deposited on the drum, permitting the cake to be uniformly washed and dried. Further than this, the capacity of the filter depends upon designing the filtrate compartments, the piping, and the automatic valve, sufficiently large to permit the filtrate to pass through these members without obstruction.

One method that has been used to effect a fairly sharp separation between the primary and secondary filtrates is shown in the Campbell Patent No. 1,868,883 and consists essentially in so designing the filter that its internal capacity, that is the volumetric capacity of the filtrate compartments and the piping to the automatic valve, is as small as possible, so that when any given compartment is shut off by the automatic valve, the residual filtrate within the compartment and its associated piping will be comparatively negligible and not seriously alter the clarity and purity of the subsequent secondary or clear filtrate. Since, however, as above pointed out the efficiency and capacity of the filter depend upon so designing the filter that the filtrate may have an unrestricted flow through it, there is a practical limit to which this principle may be carried out, and it has been found that in spite of the use of filters having relatively low internal capacities, for some purposes a sufficiently sharp separation between the primary and secondary filtrates can not be effected.

I have found that the desired result can be accomplished by rapidly draining each filtrate compartment of primary filtrate prior to the point at which the secondary filtrate is permitted to pass through the filter, and in general the object of this invention is the provision of a method and means whereby this result may be accomplished.

While filtration in all cases is effected by maintaining a differential pressure between opposite sides of the filter medium, it should be particularly noted that there can be no filtration unless there is a flow of fluid through the filter medium. For example, the condition often arises wherein the filter medium, due to the formation of a slimy cake on its surface is completely blinded or blanked off, and in spite of the existence of an appreciable differential pressure between the two sides of the filter medium, no further filtration results. To effectively drain each filtrate compartment and its associated piping of residual filtrate, it is essential that there be a differential pressure between the automatic valve and a point within each filtrate compartment remote from the valve, and it should be noted that this condition by no means necessarily prevails when there exists a differential pressure between the valve and the outer surface of the filter medium. In most instances the separation of the primary and secondary filtrates must be effected in connection with filtrate compartments which are submerged within the material being filtered, and which are therefore located on the lower side of the drum. Consequently a differential pressure must be maintained between the automatic valve and the outer surface of the filter medium or cake in order to hold the cake on the filter medium, as well as a differential pressure between the automatic valve and a point within the filtrate compartment remote from the valve, for the purpose of draining or sweeping the residual filtrate from the compartment under consideration.

Referring to the drawings:

Figure 1 is a perspective view, with parts broken away, of the drum of a rotary drum filter embodying the objects of my invention.

Figure 2 is an end elevation, with parts broken away, of the rotary drum shown in Figure 1, with its associated tank.

Figure 3 is an elevation of the outer face of the automatic valve associated with the left hand end of the drum shown in Figure 1.

Figure 4 is an elevation of the inner face of the valve shown in Figure 3.

Figure 5 is a section taken on the line 5—5 of Figure 3.

Figure 6 is an elevation of the outer face of the automatic valve associated with the right hand end of the drum shown in Figure 1.

Figure 7 is an elevation of the inner face of the valve shown in Figure 6.

Figure 8 is a diagrammatic vertical section of a filter embodying the objects of my invention, with the two valves superposed so as to illustrate more clearly the operation of the filter.

Figure 9 is a section with parts broken away, taken on the line 9—9 of Figure 10.

Figure 10 is a section taken on the line 10—10 of Figure 9.

Figure 11 is a detail of one of the valves shown in Figure 9.

As shown in Figures 1 and 2, the objects of my invention may be carried out on and embodied in a continuous rotary drum filter comprising a pulp or slurry tank 1 within which is arranged to rotate (in the direction as shown by the arrows) a drum 2, provided on its periphery with a plurality of independent filtrate compartments 3 defined by spaced parallel and longitudinally extending division strips 4. Secured to the division strips 4 over the compartments 3 is a filter medium 5, the nature of which depends upon the material to be filtered. Although forming no part of this invention, a supporting screen (not shown) is usually disposed within each compartment for the purpose of holding the filter medium in spaced relation with respect to the floor of each compartment 3. Bolted or welded to the ends of the drum 2 are trunnions 6 and 7 by which the drum is rotatably mounted on suitable bearings (not shown) secured to or otherwise associated with the tank 1. Secured over the face of the trunnion 6, as shown in Figure 5, is a pipe plate 8 provided with spaced peripherally disposed perforations 9 adapted to receive the outer ends of pipes 10 and arranged to register with perforations 11 of a wear plate 12. The wear plate 12 and pipe plate 8 are secured to the end of the trunnion 6 by bolts 13 and therefore insofar as operation is concerned, form an integral structure adapted to rotate as a unit with the drum 2. As shown in Figure 1, the inner ends of the pipes 10 communicate with pipes 14 radially disposed within the drum 2 and the outer ends of the pipes 14 communicate with longitudinally disposed manifolds 15 provided with spaced nipples 16 communicating with each compartment 3 along its leading longitudinally extending edge. Similarly secured to the trunnion 7 is a pipe plate 17 provided with peripherally disposed perforations 18 arranged to register with a set of concentric perforations (not shown) formed in the wear plate 19. Connected with the perforations 18 of the pipe plate 17 and passing through perforations 20 formed in the end of the trunnion 7 are pipes 20ª, the ends of which communicate with radially disposed pipes 20ᵇ disposed within the drum. Each of the radially disposed pipes 20ᵇ communicates with one of the manifolds 20ᶜ extending longitudinally within the drum and provided with spaced nipples 20ᵈ communicating with the filtrate compartments 3 along their trailing edges.

Engaging the outer face of the wear plate 12 is a stationary valve body 21 provided on its inner face, as shown in Figures 4 and 5, with a relatively short arcuate recess or port 22 and with a relatively long arcuate recess or port 23. Upon rotation of the trunnion 6 the perforations 11 of the wear plate 12 successively communicate with the ports 22 and 23. The valve body 21 is resiliently held against the wear plate 12 by a spring 24 carried by a bolt 25 passing through the valve body 21 and secured at its inner end to the wear plate 12. Communicating through the outer face of the valve body 21 with the port 22 is a relatively small pipe 26 provided with a throttle valve 27 by which air or other gas under controlled pressure may be permitted to pass through the pipes 10 and 14 and the manifold 15 and its associated nipples 16 into the leading edge of each compartment 3. Communicating with the port 23 through the outer face of the valve body 21 is a relatively large pipe 28, the outer end of which communicates with a suitable source of vacuum (not shown) and by means of which each of the compartments 3 formed on the periphery of the drum may be successively subjected to a subatmospheric pressure.

Resiliently contacting the outer face of the wear plate 19 is a stationary valve body 29 provided on its inner face with a pair of spaced arcuate recesses or ports 31 and 32. With the exception of the orientation of the ports 31 and 32, the construction of the valve body 29 is in all respects identical with that of the valve body 21. Communicating through the valve body 29 with the port 31 is a relatively large pipe 33, the outer end of which communicates with a suitable source of vacuum so that each of the filtrate compartments 3 may be successively subjected to a subatmospheric pressure. Connected to the valve body 29 is a small pipe 34, the inner end of which communicates with the port 32 and the outer end of which communicates with a suitable source of air.

Although for purposes of illustration each of the valve bodies has been shown in the form of a simple disc provided on its inner face with a pair of ports, in actual practice a cored valve of the character as now used on filters manufactured by Oliver United Filters Inc. would be used, so that the resistance to the passage of fluid through these valves would be decreased in accordance with standard practice. Moreover, each valve would probably be provided with adjustable or removable bridges so that the length of each port or arcuate recess could be varied as desired. These details of construction, however, do not form part of this invention and therefore are not specifically described.

The filter as shown in Figures 1 and 2 is of the low submergence type and therefore the tank or pan 1 is relatively shallow and the cake formed on the periphery of the drum is discharged largely by the action of gravity although its initial discharge may be effected by a substantially vertical doctor or scraper 35.

Associated with the filter adjacent the rising side of the drum are a plurality of nozzles 36 by which the cake formed on the drum may be subjected to a spray wash.

Referring now to Figure 8, which diagrammatically shows the valves on either end of the filter as being superposed and wherein the entire piping system associated with the pipes 10 communicating with the left hand valve has been indicated by the reference numeral 14, and the entire piping system associated with the right hand valve has been indicated by the reference numeral 20$^b$:

Assuming that the material to be filtered is maintained in the tank 1 at the level indicated and that the relative angular disposition of the ports 22 and 23 of the valve body 21 and the ports 31 and 32 of the valve body 29 are as shown in Figure 8, the operation of the filter is as follows: When any one of the compartments 3 during its rotation becomes submerged in the material to be filtered, communication is established between its piping 20$^b$ and the port 31 of the valve body 29 and this compartment will therefore be ubjected to a primary differential filtering pressure with the result that initial or cloudy filtrate is made to pass through the right hand valve. During this stage of operation a cake of solids is gradually built up on the filtering surface of the compartment, which for purposes of illustration has been considerably exaggerated in depth. Before communication is cut off between the piping 20$^b$ and the port 31, communication is established between the piping 14 and the port 22 of the left hand valve. By suitably cracking the valve 27 associated with this latter port, air may be made to flow inwardly through the piping 14 so as to sweep the initial filtrate entrained within the compartment 3 from the leading edge of the compartment to its trailing edge and out through the piping 20$^b$. With the filtrate compartment 3 clear of initial filtrate, the piping 14 then comes into communication with the port 23 of the left hand valve, thereby permitting clear or secondary filtrate to pass out through the pipe 28 into a suitable vacuum receiver. Obviously the turbidity of the filtrate passing through any compartment gradually decreases upon the travel of the compartment through the tank and depends upon the depth and nature of the cak formed on the surface of the drum due to the action of the differential filtering pressure. The economics of the process involved largely determines the degree of turbidity permissible in the secondary filtrate. The secondary or clear filtrate may consist not only of liquor passing through the filter from the tank 1 but also of liquor which passes through the cake as a result of the washing operation effected through the nozzles 36. Although the function of the valves as shown and described is to effect a separation between two filtrates of varying degrees of clarity having their source in the tank 1, the valves may be so arranged that a separation may be effected between the filtrate in its entirety as obtained from the tank 1 and the wash liquor which passes through the cake and is derived from the nozzles 36. Furthermore, the air sweep effected through the valve 27 may be imposed during the initial stages of filtration so that each filtrate compartment 3 and the piping asosciated with the right hand valve is immediately cleared of primary filtrate.

It is to be particularly noted that a differential pressure is always maintained between the exterior of each compartment and one of the valves except at the point at which the cake is discharged from the drum and that such discharge may be aided in the usual manner by a reverse pressure or blow back operating through the port 32 of the right hand valve. It should also be noted that the air emitted through the valve 27 for sweeping or clearing any compartment of residual filtrate is always such that the vacuum within the compartment is not broken, for otherwise a cake formed thereon would slough off the filter medium. Preferably the pressure within each compartment never drops lower than four or five pounds absolute. Due to the staggered angular disposition of the ports 31 and 22, a secondary differential pressure independent of and of lower intensity than the primary differential pressure is superposed upon the primary differential pressure and it is the superposition of this secondary differential pressure which serves successively to sweep or clear each filtrate compartment of primary filtrate through the right hand valve before the secondary differential pressure effected by a subatmospheric pressure on the pipe 28 serves to draw secondary filtrate through the left hand valve. To make this operation clearer, it may be noted from an inspection of Figure 1 that primary filtrate enters the compartment 3 and passes through the piping associated with the right hand valve outwardly through the pipe 33 under the action of vacuum and that the compartment 3 is then swept or cleared of primary filtrate by air admitted through the valve 27 passing downwardly through the leading edge of the compartment and across the compartment to the piping associated with the right hand valve. Once the filtrate compartment has so been freed of filtrate, secondary filtrate is drawn through the compartment and the piping associated with the left hand valve into the pipe 28 and hence to the vacuum receiver associated therewith.

The filter shown in Figures 9, 10, and 11 comprises a tank 71 within which is disposed a drum 72 arranged to rotate on trunnions 73 and 74 journaled in bearings 75 and 76 associated with the tank. Spaced, longitudinally extending division strips 77 secured to the drum define independent filtrate compartments 78 covered by a suitable filter medium 79. Engaging the outer end of the trunnion 74 is a two-solution valve 81 of standard and well known construction and having a primary or cloudy filtrate connection 82, a secondary or clear filtrate connection 83, and a blow back connection 84. Communication is successively established between the leading edge of each filtrate compartment 78 and the connections 82, 83, and 84 by pipes 85 and independent cloudy filtrate, clear filtrate and blow back ports formed in the valve 81. Communicating with the trailing edge of each filtrate compartment 78 is a pipe 86 terminating in a radially extending leg 87. Each leg 87 is provided at its free end with a valve 88 arranged to be opened and closed by a cross member 89 attached to a valve stem 91. In order to limit the angular movement of the valve stem 91, it is provided with a short arm 92 arranged to engage a stop 93 carried by the valve body. Threaded to the upper end of the valve body is a plug 94 formed with an aperture 95 for admitting air into the valve body and through the pipe 87 when the valve stem 91 is in its open position. The amount of air permitted so to pass through the valve may be varied by having available a number of plugs 94, the apertures 95 of which differ in size. Each cross member 89 is arranged to be opened and closed once during each revolution of the drum by successively engaging resilient stop members 96 and 97 secured to the tank 71 in the path of the cross members 89. The location of the stop member 96 determines the point at which each valve 88 is opened, and the location of the stop member 97 determines the point at which the valve body is closed.

The operation of this type of filter is substantially the same as the operation of the filter shown in Figures 1 and 2. The cloudy filtrate is drawn through the cloudy filtrate port of the two-solution valve 81. The residual cloudy filtrate remaining in the filtrate compartments and the pipes 85 is swept through the cloudy filtrate port by the introduction of air into the pipes 87 through the valves 88, and then the clear filtrate is picked up through the clear filtrate port of the valve 81. The cake formed on the drum may be washed, dried, and discharged in the usual manner.

Other valves for controlling the primary and secondary differential pressures may obviously be resorted to, but it is thought that the two arrangements shown in Figures 1 and 2 and Figures 9, 10, and 11 are sufficient to illustrate the principles and objects of my invention.

While my invention has been particularly described with reference to continuous rotary drum filters of the vacuum type, it may also be applied to continuous pressure filters and to filters, either vacuum or pressure, of the intermittent type.

I claim:

1. A filter cell containing only one filtrate-receiving chamber and provided with a pair of remotely spaced fluid connections; means including one of said connections for subjecting said cell to a primary differential filtering pressure; and means including both of said connections for simultaneously subjecting remote portions of the interior of said cell to a secondary differential pressure of less intensity than said primary differential filtering pressure.

2. A filter comprising: a plurality of independent filter cells each containing only one filtrate chamber and each arranged to travel in a closed path successively through a body of material to be filtered; a pair of connections communicating with each cell at spaced points; means for periodically establishing a primary differential filtering pressure between the exterior of each cell and one of said connections; and independent means for periodically establishing a secondary differential pressure between each pair of said connections of less intensity than said primary differential filtering pressure.

3. The method of operating a filter cell arranged to be periodically rotated through a body of material to be filtered, comprising: drawing off the initial filtrate through the trailing edge of said cell, and then drawing off the subsequent filtrate through the leading edge of said cell while said cell is below its axis of rotation.

4. The method of operating a filter having a plurality of filter cells arranged to travel in a closed path through a body of material to be filtered, comprising: successively drawing off the initial filtrate through the trailing edge of each cell and successively drawing off the subsequent filtrate through the leading edge of each cell, while said cell is below its axis of rotation.

5. The method of operating a continuous filter having a plurality of contiguous filter cells arranged successively to pass through a body of pulp to be filtered, comprising: successively subjecting each of said cells to a primary differential filtering pressure; and successively imposing on said primary differential filtering pressure between remote points within each cell, a secondary differential pressure of less intensity than said primary differential pressure.

6. The method of operating a continuous filter having a plurality of contiguous filter cells each provided with a filtrate connection and arranged successively to pass through a body of pulp to be filtered, comprising: successively subjecting each cell through its filtrate connection to a primary differential filtering pressure for the purpose of drawing initial filtrate into each cell; imposing on said primary differential filtering pressure a secondary differential pressure between said filtrate connection and a point remote therefrom for the purpose of sweeping each cell clear of entrained initial filtrate, said secondary differential pressure being of less intensity than said primary differential pressure; relieving said secondary differential pressure during the passage of secondary filtrate into each cell; and cutting off said primary differential filtering pressure during the discharge of the cake formed on the filtering surface of each cell.

7. A filter comprising: a tank; a drum arranged to rotate in said tank; a plurality of longitudinally extending filtrate compartments formed on the surface of said drum; a valve associated with each end of said drum; means successively operable through one of said valves for establishing a primary differential pressure between the exterior and interior of each of said compartments; and means successively operable through the other of said valves for imposing a secondary differential pressure between spaced points within said cell and acting in the same direction as said primary differential pressure.

8. The method of operating a filter cell arranged to be periodically rotated through a body of material to be filtered, comprising: drawing off the initial filtrate through the trailing edge of said cell, and then drawing off the subsequent filtrate through the leading edge of said cell.

9. The method of operating a filter having a plurality of filter cells arranged to travel in a closed path through a body of material to be filtered, comprising: successively drawing off the initial filtrate through the trailing edge of each cell and successively drawing off the subsequent filtrate through the leading edge of each cell.

10. A filter comprising: a tank; a filter cell covered with a filter medium and arranged to travel through said tank; a pair of connections communicating with the interior of said cell at remotely spaced points; means for causing a flow of fluid through said filter medium into said cell and out through one of said connections; and means for causing a flow of fluid through one of said connections into said cell, across said cell, and out through the other of said connections.

ALLAN R. DUVALL.